May 10, 1955  E. M. BOAT ET AL  2,707,931
TOLERANCE MARKER FOR DIAL INDICATOR GAGES
Filed Feb. 12, 1954
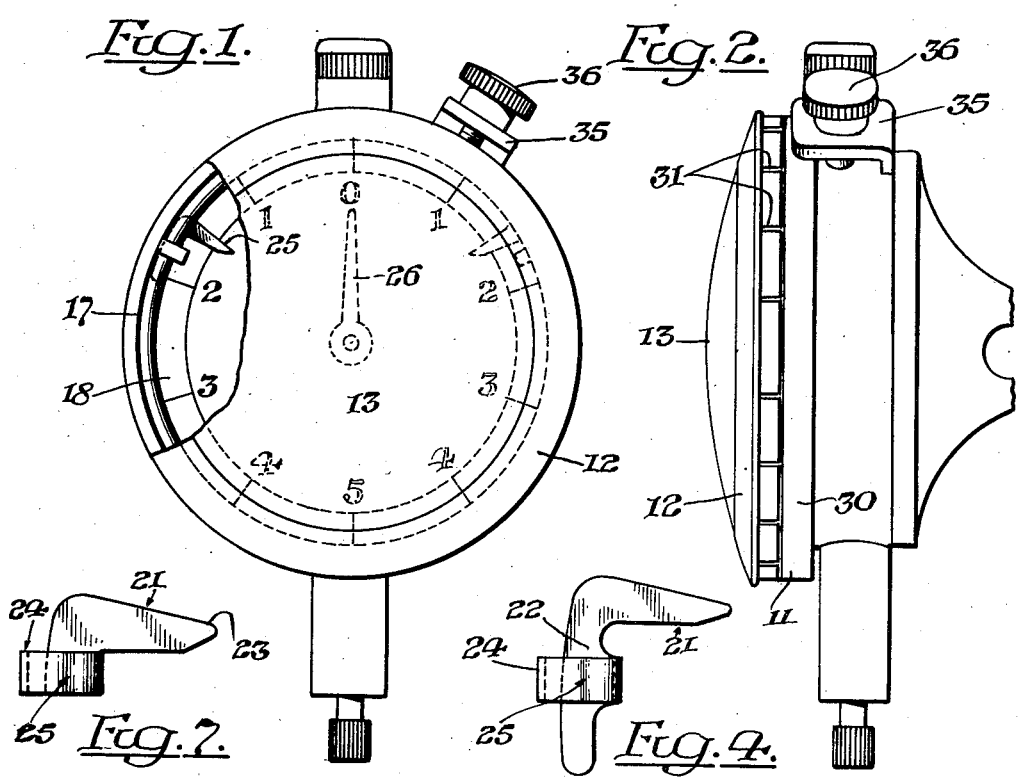
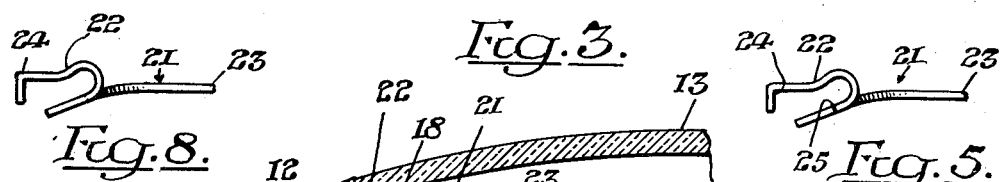
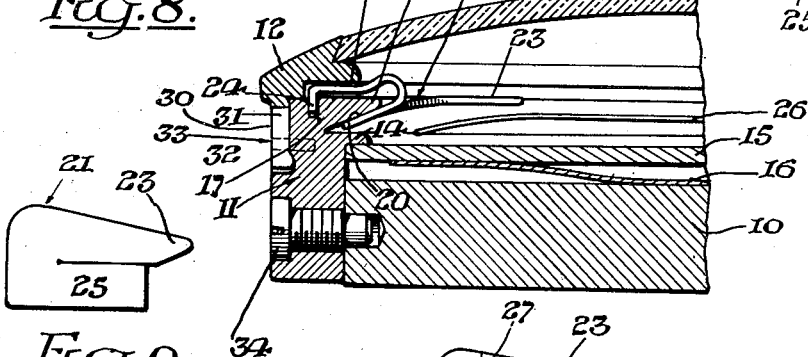
INVENTORS,
Earl M. Boat
Walter J. Crosher
BY Darby & Darby
THEIR ATTORNEYS, UnitedStates Patent Office
2,707,931
Patented May 10, 1955

2,707,931

TOLERANCE MARKER FOR DIAL INDICATOR GAGES

Earl M. Boat, Poughkeepsie, and Walter J. Croshier, Hyde Park, N. Y., assignors to Standard Gage Company, Inc., Poughkeepsie, N. Y., a corporation of New York Application February 12, 1954, Serial No. 409,954

10 Claims. (Cl. 116—124)

The present invention relates to dial indicator gages and particularly to adjustable markers positioned in a manner to be movable in relation to the gage dial so that when tolerance limits have been established the markers may be set at these limits.

More particularly still the invention relates to such markers which may be retained in their adjusted position while the gage dial is rotated in order to set the zero point thereof in the position determined by master gages such as Johansson or Hoke blocks.

In the past tolerance markers have sometimes been utilized. The most common form which such tolerance markers took was hands rotatably mounted in the dial crystal with shafts extending through that crystal to the outside and terminating in knurled knobs which could be manually operated to set the markers at desired points. This arrangement is satisfactory for many purposes but has the disadvantage that the crystal cannot readily be cleaned because of the obstruction at the center thereof and further the settings of the tolerance markers are apt to be disturbed at the cleaning. Additionally a resetting of the indicator to a master may cause movement of the tolerance markers.

Another form of tolerance marker which has been utilized to a limited extent involves the use of a two-part bezeled ring having one marker fixed to the rotatable outer ring which carries the crystal and another marker movable under drive of the first marker, the driven marker sliding in a groove of the inner portion of the bezel ring which portion also carries the dial. With this arrangement the usual bezel clamp locks both parts of the bezel ring and thus, when the rings are released to permit resetting the gage with its zero corresponding to the setting of the master gage, there is a possibility of inadvertently rotating one part of the ring more or less than the other and thereby changing the setting of the tolerance marker.

The present invention provides tolerance markers which are individually set and which retain their position despite repeated resetting of the indicator dial to zero in accordance with the value determined by a master such as the Johansson blocks mentioned above. Since tolerance changes are less frequent than are checkings of the zero setting it is clear that the present arrangement which permits the maintenance of the tolerance settings has a great advantage.

It is an object of the invention to provide tolerance markers for a dial indicator gage which markers will retain their adjusted positions despite resettings of the indicator dial to zero.

It is a further object of the invention to provide such tolerance markers which do not obstruct the indicator crystal and thus do not interfere with the vision of the indicator hand and dial while at the same time permitting cleaning of the crystal.

It is a further object of the invention to provide a dial indicator having such adjustable tolerance markers without measurably increasing the cost of the indicator.

Other objects and features of the invention will be apparent when the following description is considered in connection with the annexed drawings, in which, Figure 1 is a front elevation of a dial indicator gage, a part of the crystal and bezel ring being broken away in order to show a mounting of one of the two tolerance indicators;

Figure 2 is a side elevation of the dial indicator gage of Figure 1;

Figure 3 is a fragmentary cross-sectional view of the dial indicator showing the shape of one of the tolerance markers and the mode in which it is mounted on the dial carrying ring of the indicator. This view is drawn to a much enlarged scale;

Figure 4 is a top plan view of one of the tolerance markers;

Figure 5 is a side elevation of the tolerance marker of Figure 4;

Figure 6 is a plan view of the blank from which the tolerance marker of Figures 4 and 5 is made;

Figure 7 is a plan view of a modified form of tolerance marker which is sometimes advantageous since it has less circumferential extent than does the marker of Figures 4 through 6;

Figure 8 is a side elevation of the marker of Figure 7; and

Figure 9 is a plan view of the blank from which the tolerance marker of Figures 7 and 8 is made.

Referring now to the drawings and particularly to Figure 3, there is shown at 10 the usual base member of a dial indicator which is a circular plate. The ring 11 is normally mounted on the plate 10 so that it can be rotated with respect thereto and in the normal construction the bezel ring 12 is integral with the ring 11 and has fixed therein the crystal 13. In the present instance the dial ring 11 and the bezel ring 12 are separate and are rotatable with respect to each other as clearly shown in Figure 3. Dial ring 11 is provided with an inwardly projecting circumferential rim 14 against which the indicator dial 15 is pressed by the dial spring 16, this being the customary construction.

In accordance with the present invention not only is the dial ring 11 made separately from the bezel ring 12, but in addition the dial ring 11 is provided with a circumferentially extending groove 17 in its upper edge and is formed with the inwardly extending circumferential projection 18, this projection having a downwardly and outwardly extending lower surface 20.

The groove 17, together with the projection 18, forms a mounting means for the tolerance markers 21. These tolerance markers comprise spring clip portions 22 and radially extending indicator portions 23. The portion 22 of the tolerance indicator or marker includes a portion 24 which is bent at right angles to the main body and which extends into the groove 17 in the upper surface of dial ring 11. Portion 22 also includes the return bent portion 25 which cooperates with the horizontally extending portion to clamp to the projection 18 so that the marker will be retained in any position in which it is set, it being readily placed in position by simply springing the two legs of the return bend apart. The portion 23 forms an extension of the return bent portion 25 and has a bend therein so that the inner portion thereof extends horizontally adjacent to the main indicator hand 26.

One convenient mode of forming a tolerance marker as described above is shown in Figure 6 which indicates the shape of the sheet metal blank from which the tolerance marker is formed prior to that blank having been bent into the ultimate shape. This blank is preferably stamped from spring stock such, for example, as spring bronze or spring brass. In forming the blank shown in Figure 6 it may first be bent along the dotted line 27 to form the sloped and horizontal portions 23 of the tolerance marker and thereafter the portion 25 formed with the return bend and with the dependent portion 24 by suitable bending along lines such as 28 and 30. As will be obvious, the tolerance markers are made in pairs from blanks which are substantially mirror images of each other so that left and right hand markers are formed for insertion in the groove 17, one at either side of the indicator hand. Thus one marker indicates the lower tolerance limit and the other the upper tolerance limit.

In some instances it is desirable to provide what may be termed secondary tolerance markers which are at times necessary in order to classify parts for selective assembly. This may readily be accomplished by providing a second tolerance marker which is narrower in the circumferential direction than is the main tolerance marker and can therefore be placed closely adjacent to the main tolerance marker. Such secondary tolerance markers are shown in their finished form in Figures 7 and 8 and the developed blank therefore is indicated in Figure 9. These markers are essentially similar to those previously described save that the circumferential spacing between the portions 23 and 22 is omitted and the portions are formed immediately adjacent one another.

As has been stated in order to adopt the dial indicators to the use of such tolerance markers the bezel ring 12 is made separately from the dial ring 11. This bezel ring 12 may be of any one of a number of known forms, but in the present instance is of a snap-on type in which the rim 30 thereof is formed with a plurality of slits 31 therein so that it may readily snap over the shouldered portion 32 of the dial ring 11. In some instances it is desirable that one or more pins 33 be inserted in the outer face of the shouldered portion 32 of the dial ring extending outwardly into the slits 31 in the snap-on rim of the bezel ring 12. This assures that the bezel ring will not rotate on the dial ring and prevents any movement of the tolerance markers due to possible friction between the lower horizontally extending surface of the bezel ring and the tolerance markers. The dial ring 11 is held in position on the base 10 by the usual screw 34 and is clamped in its rotated position by means of the usual bezel ring clamp 35 operated by the usual knurled screw 36 and clamping the dial and bezel rings in place by means of a rim on the lower surface by clamp 35 which cooperates with a knurled portion of the outer circumference of the dial ring 11.

It will be obvious from the foregoing description that the tolerance markers of our invention can be readily positioned on the dial ring and that they will be retained in their adjusted positions despite readjustment of the dial ring 11 and the dial 15 which is of course caused to move with the dial ring by virtue of the frictional engagement resulting from the pressure exerted by dial spring 16. It will further be clear that the tolerance markers may be readily positioned since they are merely snapped over the projection 18 of the dial ring and are held in frictional engagement by the spring action of the spring clip portion 22 of the tolerance marker. Moreover, the markers may be readily reset to new positions since the bezel ring can be readily removed to afford access to the tolerance markers and can readily be replaced. It may be mentioned at this point that in some instances the bezel ring 12 may be dispensed with as a separate unit and the crystal 13 be formed of a molded transparent plastic having the clamping rim 30 formed integrally therewith.

While we have described preferred embodiments of our invention will be understood that many other modifications may be made without deviating from the principles thereof; therefore we wish to be limited not by the foregoing description, but solely by the claims granted to us.

What is claimed is:

1. In a dial indicator gage of the type having a dial adjustably rotatable with respect to an indicating pointer, the improvement which comprises a dial ring on which the dial is mounted, a separate bezel ring mounted on said dial ring for rotation therewith and including a transparent member enclosing the dial and pointer, and a plurality of tolerance markers adjustably mounted on said dial ring within said bezel ring and transparent member, the indicating portion thereof extending radially inwardly, lying substantially in the plane of the indicating pointer and cooperating with the dial scale to indicate upper and lower limits of tolerence, said markers moving with said dial ring as said ring is rotated with respect to the indicating pointer.

2. A device as claimed in claim 1, characterized in that said dial ring is provided with a circumferential groove in the upper surface thereof and said tolerance markers are adjustably mounted in said groove.

3. A device as claimed in claim 2, characterized in that said tolerance markers comprise an indicating portion and a gripping portion, said markers being formed of resilient material, and further characterized in that said dial ring has a circumferential rib of shape matching that of said gripping portion and extending inwardly therefrom adjacent said groove, said gripping portion of said markers cooperating with said rib to hold said markers in adjusted position on said ring.

4. A device as claimed in claim 3, characterized in that said gripping portion of said markers terminates in a bent-over portion which extends into said groove in said dial ring.

5. A device as claimed in claim 3, characterized in that the bezel ring is removable from the dial ring in order to facilitate adjustment of said tolerance markers.

6. A tolerance marker for dial indicator gages comprising a strip of resilient material terminating at one end in a tapered indicating hand and being bent upon itself to form a gripping member at the opposite end from said hand, the upper leg of said gripping member lying in substantially the same plane as said hand, said upper leg terminating in a bent-over portion extending downwardly, said lower leg of said gripping member extending downwardly and terminating beneath and spaced from said bent-over portion of said upper leg.

7. A tolerance marker as claimed in claim 6, characterized in that said indicator hand and said gripping member are laterally separated being joined by a narrow integral connecting strip.

8. A tolerance marker as claimed in claim 6, characterized in that said indicator hand and said gripping member are immediately adjacent each other.

9. A tolerance marker as claimed in claim 6, characterized in that the entire tolerance marker is formed from a single sheet of material, said gripping member being formed therefrom at a portion bent from an angle of 180° to extend in a direction generally opposite to that in which said hand extends.

10. A tolerance marker as claimed in claim 6, characterized in that said gripping member is V-shaped.

References Cited in the file of this patent

UNITED STATES PATENTS

| | | |
|---|---|---|
| 1,490,896 | Green | Apr. 15, 1924 |
| 1,881,389 | Ricketts | Oct. 4, 1932 |
| 2,013,176 | Session | Sept. 3, 1935 |

FOREIGN PATENTS

| | | |
|---|---|---|
| 376,852 | Great Britain | July 21, 1932 |